United States Patent [19]

Sakikawa et al.

[11] Patent Number: 4,802,546
[45] Date of Patent: Feb. 7, 1989

[54] STEERING APPARATUS FOR A VEHICLE

[75] Inventors: Shigenori Sakikawa, Itami; Toshiaki Okanishi, Kobe, both of Japan

[73] Assignee: Kanzaki Kokyukoki Mfg. Co. Ltd., Japan

[21] Appl. No.: 144,972

[22] Filed: Jan. 19, 1988

[30] Foreign Application Priority Data

Jan. 19, 1987 [JP] Japan .................... 62-6878[U]
Jun. 2, 1987 [JP] Japan .................... 62-85954[U]

[51] Int. Cl.⁴ .............................................. B62D 5/06
[52] U.S. Cl. ...................................... 180/132; 100/149; 100/151; 100/154
[58] Field of Search ............... 180/132, 141, 142, 143, 180/148, 149, 151, 154, 79.1, 79.3

[56] References Cited

U.S. PATENT DOCUMENTS

| 4,297,845 | 11/1981 | Kyster | 180/132 |
| 4,629,024 | 12/1986 | Buike et al. | 180/79.1 |
| 4,639,651 | 1/1987 | Shimizu | 180/79.1 |
| 4,687,976 | 8/1987 | Shimizu | 180/79.1 |

FOREIGN PATENT DOCUMENTS 49-82031 8/1974 Japan .
49-85728 8/1974 Japan .

Primary Examiner—Kenneth R. Rice
Attorney, Agent, or Firm—Saidman, Sterne Kessler & Goldstein

[57] ABSTRACT

A steering apparatus of both mechancial and hydraulic systems for a vehicle which devised the conventional steering box itself so as to attach a steering hydraulic valve directly to a steering case at the steering gear box, thereby being steerable by the steering gear box.

2 Claims, 5 Drawing Sheets 4,802,546

STEERING APPARATUS FOR A VEHICLE

FIELD OF THE INVENTION

The present invention relates to a steering apparatus for a vehicle operable by both hydraulic and mechanical methods.

DESCRIPTION OF THE PRIOR ART

The prior art regarding a power steering mechanism capable of mechanically or hydraulically steering the vehicle has been disclosed in the Japanese Utility Model Laid-Open Gazette No. Sho 61-152576 and well-known.

SUMMARY OF THE INVENTION

In the prior art disclosed in the aforesaid Gazette No. Sho 61-152576, since a steering valve is interposed in part of a drag rod between a pitman arm and a knucle arm, its mounting position is below a running vehicle to overlap with the position where a steering cylinder S is disposed, thereby causing inconvenience such that the mounting place is restricted and pipings for the hydraulic system have no space.

Also, the gears and drag rod in a steering box are required as the same as the mechanical steering apparatus, thereby causing inconvenience in that they are not simplified from the viewpoint of the number of parts.

The present invention has been designed in the light of the aforesaid circumstances. An object thereof is to provide a steering apparatus which devices the conventional steering gear box itself to attach the steering hydraulic valve V directly to the steering case and the steering apparatus is made steerable by the steering gear box, thereby being usable by both the mechanical and hydraulic methods.

Also, in the steering apparatus of the invention, a handle can be operated to quickly switch the steering hydraulic valve V so that a large backlash is not caused at the handle.

The above and further objects and novel features of the invention will more fully appear from the following detailed description when the same is read in connection with the accompanying drawings.

DESCRIPTION OF THE PREFERRED EMBODIMENT

Figure 1:
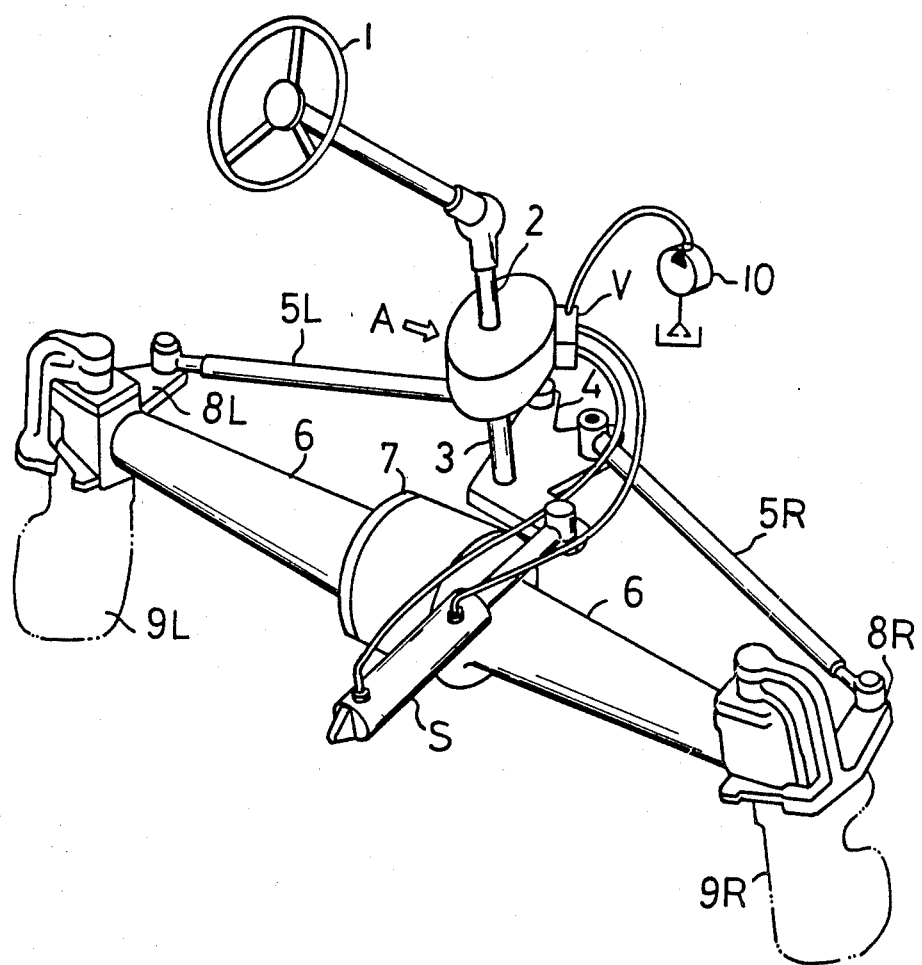
FIG. 1 is a perspective view of a steering apparatus for a vehicle of the invention.

Next, explanation will be given on the entire construction of a steering apparatus of the invention with reference to FIG. 1, in which front axles 6 laterally project from both sides of a front differential case 7, steering bevel gear boxes 9L and 9R being disposed at the outer ends of the front axles 6 respectively.

Tie rods 5L and 5R are pivotally connected to knucle arms 8L and 8R which rotate the bevel gear boxes 9L and 9R for steering and to a drag arm 4 at the center of a body of the steering apparatus.

A steering wheel side shaft 3 is provided at the axis of rotation of the drag arm 4, which rotates by a handle 1 when rotated and by a steering cylinder S expanded or contracted through a steering hydraulic valve V when switched.

Between a handle shaft 2 at the handle 1 and the steering wheel side shaft 3 at the drag arm 4 is interposed a steering mechanism A of the principal portion of the steering apparatus of the invention. In addition, a hydraulic pump 10 feeds pressure oil toward the steering hydraulic valve V.

Figure 2:
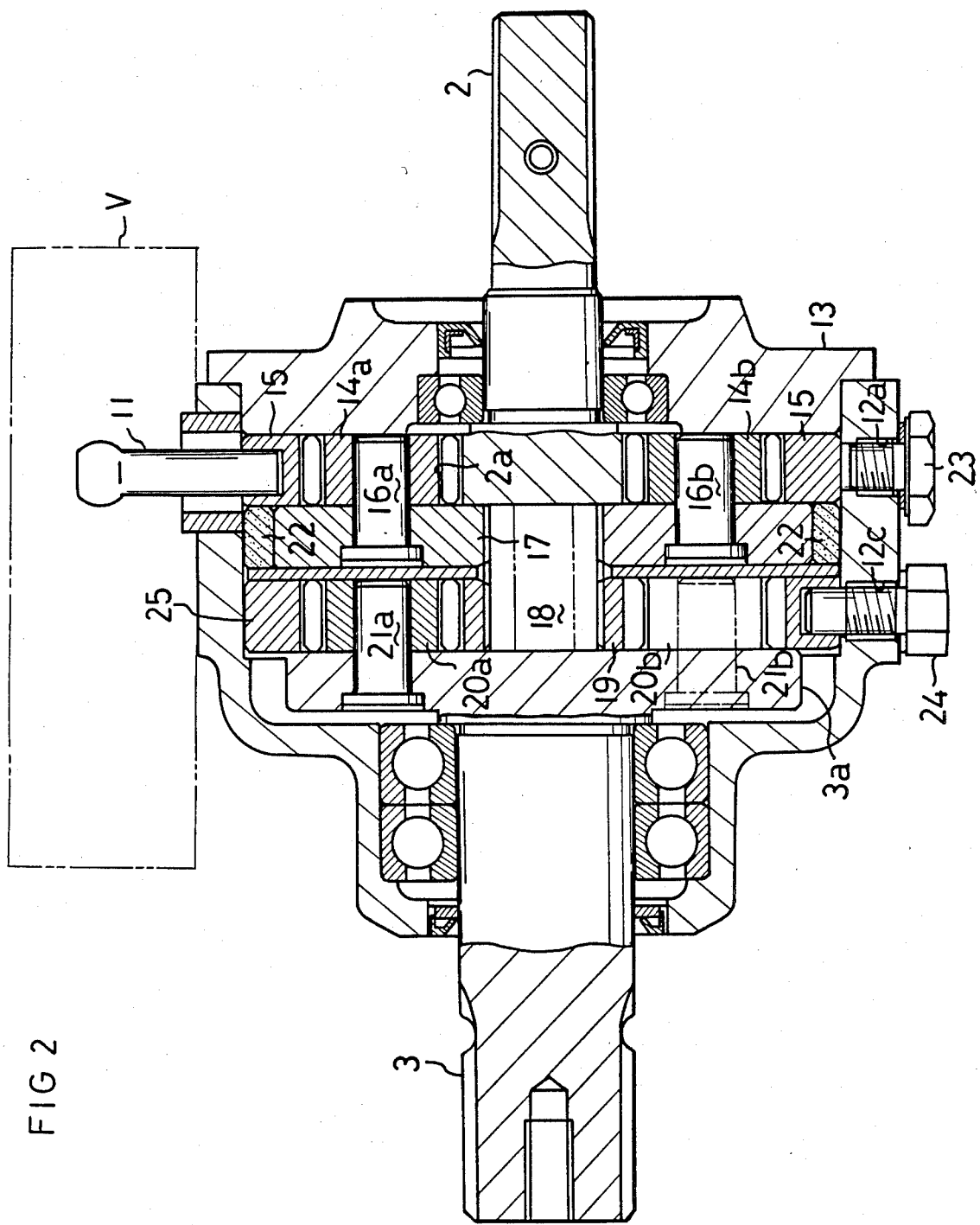
FIG. 2 is a sectional side view of a steering case at the steering apparatus in FIG. 1.
Figure 3:
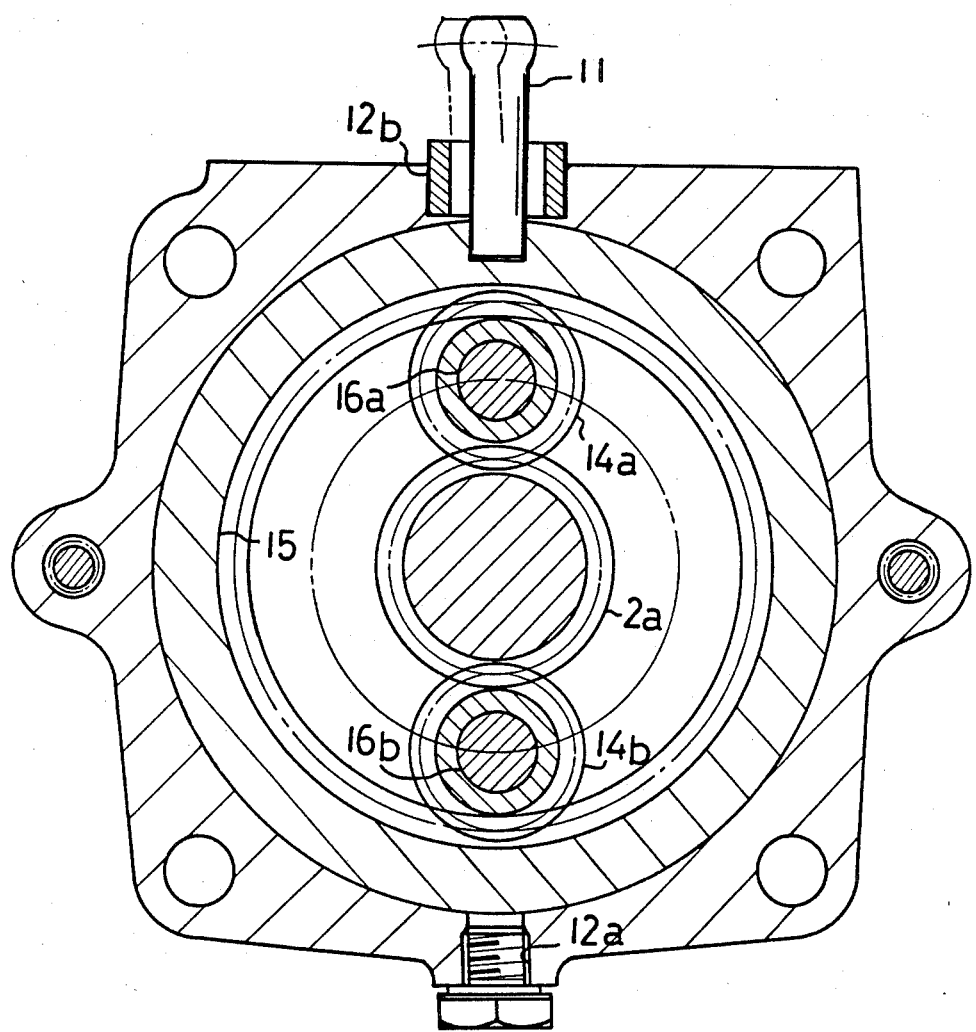
FIG. 3 is a sectional plan view of the same.

Referring to FIGS. 2 and 3, a lid 13 is fixed to a steering case 12 and the steering hydraulic valve V is fixed to the outer periphery of the steering case 12, the steering case 12 being fixed not-rotatably to a frame of the vehicle.

The handle shaft 2 is inserted into the steering case 12 from the handle 1 side and the steering wheel side shaft 3 projects from the steering case 12 toward the drag arm 4 positioned below, the steering wheel side shaft 3 being fixed to the axis of rotation of the drag arm 4 as above-mentioned.

A first sun gear 2a is integral with the lower end of the handle shaft 2, planetary gears 14a and 14b engage at external teeth thereof with the first sun gear 2a, and a ring gear 15 engages at internal teeth thereof with the planetary gears 14a and 14b at the external teeth thereof.

The ring gear 15, when the steering apparatus is used as the hydraulic one, is not fixed to the steering case 12, but is freely rotatable.

A first carrier 17 supporting the planetary gears 14a and 14b at a first planetary gear train associates with a second sun gear 19 at a second planetary gear train through a carrier shaft 18, the second sun gear 19 engaging with planetary gears 20a and 20b, and a ring gear 25 engaging at internal teeth thereof with the planetary gears 20a and 20b and being fixed to the steering case 12 through a fixed bolt 24 screwing with a threaded bore 12C at the steering case 12. In addition, a second carrier 3a is connected to the steering wheel side shaft 3.

Figure 4:
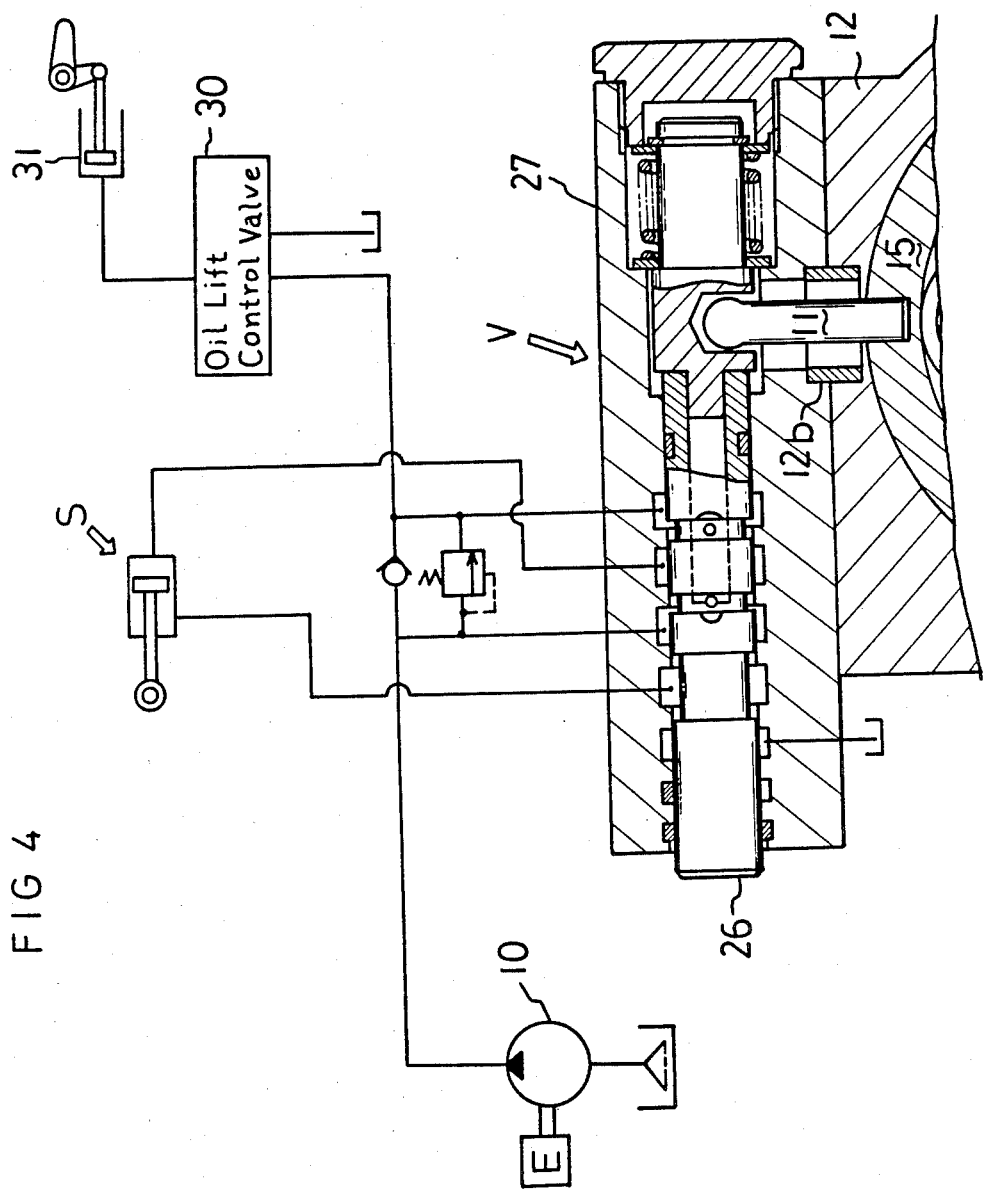
FIG. 4 is a sectional view in part of a steering hydraulic valve.

The steering hydraulic valve V, as shown in FIG. 4, is fixed onto an outer wall of the steering case 12 and outside an elongate slot 12b at the outer periphery of the same. At one end of a spool 26 at the steering hydraulic valve V is formed a recess into which a steering valve switching member 11 projecting from the ring gear 15 is inserted.

The spool 26 is axially slidable by rotation of the ring gear 15 through the steering valve switching member 11 and adapted to always return to the neutral position within a valve case of the steering hydraulic valve V by means of a neutral return spring 27 therein.

On the contrary, when the steering apparatus of the invention is used as the mechanical steering apparatus, a blind bolt 23 screwed with a threaded bore 12a at the steering case 12 is removed and a fixed bolt screws with the bore 12a so as to lock the ring gear 15, thereby operating the first planetary gear train merely as a speed reducer.

In the case where the ring gear 15 is fixed, the rotation of the handle shaft 2 after reducing the rotational speed by the first and second planetary gear trains is transmitted from the second carrier 3a to the steering wheel side shaft 3 through the planetary gears 21a and 21b.

In the present invention, an annular resistance member 22 formed of synthetic resin or rubber is interposed in a doughnut like annular gap between the outer periphery of the first carrier 17 and the inner periphery of the ring gear 15, and applies to the first carrier 17a frictional resistance force larger than a biasing force of the neutral return spring 27 at the steering hydraulic valve V.

In FIG. 4, a reference numeral 31 designates a hydraulic cylinder for raising or lowering a working machine attached to the running vehicle, and 30 designates a hydraulic valve for controlling the hydraulic cylinder 31.

Figure 5:
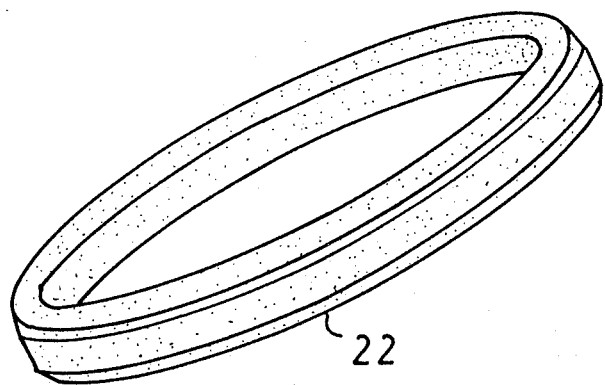
FIG. 5 is a perspective view of a resistance member.

Referring to FIG. 5, the resistance member 22 is shown in the perspective view.

Next, explanation will be given on operation of the steering apparatus of the invention constructed as above-mentioned.

When the handle 1 is rotated in the steering direction, the first sun gear 2a rotates, at which time the drag arm 4 is fixed so that the steering wheel side shaft 3 and second planetary gear train are fixed and the first carrier 17 and planetary gear shafts 16a and 16b are stationary, whereby the planetary gears 14a and 14b rotate only around the planetary gear shafts 16a and 16b, thereby enabling the ring gear 15 to be rotated.

Also, since the steering valve switching member 11 provided at the outer periphery of the ring gear 15 engages with one end of the spool 26 at the steering hydraulic valve V so as to be subjected to a biasing force of the neutral return spring 27, the ring gear 15 is locked. Before the ring gear 15 rotates, if the resistance member 22 is not inserted, the ring gear 15 finally starts its rotation at the point of time when the first carrier 17 starts its rotation and a driving force is transferred to the second planetary gear train so as to be transmitted to the steering wheel side shaft 3.

When the resistance member 22 generating the resistance force larger than the biasing force of the neutral return spring 27 at the steering hydraulic valve V is provided between the outer periphery of the first carrier 17 and the inner periphery of the steering case 12, it is advantageous that resistance is given to rotation of the first carrier 17, so that before the first carrier 17 transmits the driving force to the second planetary gear train, the ring gear 15 at first is rotatable.

The ring gear 15 rotates to move the steering valve switching member 11 in one direction or the other direction, thereby switching the steering hydraulic valve V.

When the steering valve switching member 11 moves to switch the steering hydraulic valve V, pressure oil is supplied to one chamber at the double acting type steering cylinder S so that the drag arm 4 rotates and the steering wheel rotates in the direction of rotating the handle 1, thereby finishing the steering operation.

At the same time, the rotation of drag arm 4 is transmitted to the steering wheel side shaft 3 so that the second carrier 3a rotates, at which time the operator fixes the handle 1 at a desired position after rotation, whereby the first sun gear 20 is kept stationary.

The planetary gear shafts 21a and 21b revolve following rotation of the second carrier 3a, and the ring gear 25 is fixed to the steering case 12, whereby the planetary gears 20a and 20b, while rotating, revolve around the second sun gear 19. Hence, the second sun gear 19 is rotated to rotate the first carrier 17 through the carrier shaft 18, thereby revolving the planetary gear shafts 16a and 16b.

When the planetary gear shafts 16a and 16b revolve, the first sun gear 2a is fixed as above-mentioned, mentioned, whereby the planetary gears 14a and 14b revolve while rotating. Hence, the ring gear 15 is rotated reversely to the aforesaid case so as to move the steering valve switching member 11 in the direction of returning the steering hydraulic valve V to the original neutral position.

In the state where the steering valve switching member 11 returns to the neutral position, the steering cylinder S stops its expansion or contraction, whereby the operation from the side of steering wheel side shaft 3 stops, thus finishing the steering operation.

In the above case, the fixed bolt is not screwed with the threaded bore 12a at the ring gear 15 to use the steering apparatus as the hydraulic steering apparatus. In the case where the fixed bolt is screwed with the bore 12a, the steering apparatus can be constituted in a cheap mechanical steering apparatus not-requiring the steering valve switching member 11 and steering hydraulic valve V. Hence, the first planetary gear train operates, as the same as the second planetary gear train, merely as a speed reduction device and largely reduces the rotation speed when an operating force of the handle 1 is transmitted to the steering wheel side shaft 3, thereby enabling the operator to reduce an operating force for rotating the handle 1.

In a case where the hydraulic system at the hydraulic steering apparatus of the invention is in failure, when the handle 1 is operated, the steering valve switching member 11 abuts against the elongate slot 12b at the periphery of the steering case 12 to thereby restrain the ring gear 15 from further rotation, whereby the mechanical steering largely reduced in speed as the same as the former case can easily be performed, thereby safely avoiding an unexpected trouble.

The present invention constructed as above-mentioned has the following effects:

Firstly, when the handle shaft 2 rotates, after the ring gear 15 rotates in a predetermined range, the steering valve switching member 11 abuts against the elongated slot 12b at the periphery of steering case 12 to make the ring gear 15 not-rotatable, whereby the further rotation of the handle shaft 2 is reduced in speed and transmitted to the steering wheel side shaft 3 through the two rows of first and second planetary gear train mechanism, resulting in that a large reduction gear ratio is obtained. Hence, the steering apparatus of the invention, when the hydrautic steering pump is in trouble or the engine stops, is steered as the mechanical steering apparatus with the large reduction function, thereby enabling the easy and safe steering.

Secondly, in a case where the hydraulic steering apparatus is not required, the ring gear 15 is selectively fixed and the steering hydraulic valve V is removed from the steering case 12, whereby the steering mechanism A is changeable merely to the steering gear box, thus enabling the steering apparatus to be simply converted into the hydraulic or mechanical steering one.

Thirdly, between the outer periphery of the first carrier 17 at the second planetary gear train and the inner periphery of the steering case 12 is provided the resistance member 22 which generates the resistance force larger than the biasing force of the spring 27 for neutral-returning the steering hydraulic valve V, whereby the ring gear 15 is rotatable before the rotation of handle 1 is transmitted to the second planetary gear train.

In brief, when the resistance member 22 is omitted, the ring gear 15 rotates after the rotation of the handle 1 is transmitted from the second planetary gear train to the steering wheel side shaft 3, at which time a backlash of the gears at the second planetary gear train delays rotation of ring gear 15 so as to take much time to switch the steering hydraulic valve V and the handle 1 causes large play.

On the contrary, the steering apparatus of the invention, in which resistance is given to the first carrier 17 to restrain its free rotation so that the rotation of handle 1 is not transmitted to the second planetary gear train, but the first planetary gear train only transmits the driving force to the ring gear 15 to be rotated, whereby the steering hydraulic valve V can quickly be switched, the handle is free from large play, and the steering operation can quickly be carried out.

While an embodiment of the invention has been shown and described, the invention is not limited to the specific construction thereof, which is merely exemplary in the specification rather than is defined.

What is claimed is:

1. A steering apparatus for a vehicle characterized in that
    a first sun gear (2a) fixed to a handle shaft (2) at a handle (1) of a vehicle, planetary gears (14a) and (14b), and a ring gear (15) constitute a first planetary gear train,
    a first carrier (17) supporting said planetary gears (14a) and (14b) at said first periphery gear train is fixed to a second sun gear (19) at a second planetary gear train,
    said second sun gear (19), planetary gears (20a) and (20b), and a ring gear (25) constitute a second planetary gear train,
    a second carrier (30) supporting said planetary gears (20a) and (20b) is fixed to a steering wheel side shaft (3),
    said ring gear (25) at the second planetary gear train is fixed to a steering case (12), said ring gear (15) at the first planetary gear train being made rotatable and desirably stationary within said steering case (12), and
    a steering valve switching member (11) provided at the outer periphery of said ring gear (15) and rotatable in a predetermined range with respect to said steering case (12) enables a steering hydraulic valve (V) to be desirably switched in order to steer said vehicle.

2. A steering apparatus for a vehicle as set forth in claim 1, characterized in that between the outer periphery of said first carrier (17) and the inner periphery of said steering case (12) is interposed a resistance member (22) which generates a resistance force larger than a biasing force of a neutral return spring (27) at said steering hydraulic valve (V).

* * * * *

UNITED STATES PATENT AND TRADEMARK OFFICE
CERTIFICATE OF CORRECTION

PATENT NO. : 4,802,546

DATED : February 7, 1989

INVENTOR(S) : Sakikawa et al.

It is certified that error appears in the above-identified patent and that said Letters Patent is hereby corrected as shown below:

Column 4, line 2, after "above-mentioned," delete "mentioned,";

Claim 1, line 8, delete "periphery" and substitute therefor

--planetary--.

Signed and Sealed this

Twenty-seventh Day of June, 1989

Attest:

DONALD J. QUIGG

Attesting Officer

Commissioner of Patents and Trademarks